(12) United States Patent
Pophusen et al.

(10) Patent No.: US 6,630,216 B2
(45) Date of Patent: Oct. 7, 2003

(54) MOLDED PLASTIC ARTICLE COMPRISING A BARRIER FILM

(75) Inventors: Dirk Pophusen, Leverkusen (DE); Gerhard Opelka, Leverkusen (DE); Detlev Joachimi, Krefeld (DE); Helmut Schulte, Krefeld (DE); Karsten-Josef Idel, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/915,698

(22) Filed: Jul. 26, 2001

(65) Prior Publication Data

US 2002/0071953 A1 Jun. 13, 2002

(30) Foreign Application Priority Data

Jul. 28, 2000 (DE) .......................................... 100 37 269

(51) Int. Cl.$^7$ ............................ B32B 1/02; B32B 18/00; B32B 27/06; B32B 27/30; B32B 31/30
(52) U.S. Cl. ..................... 428/35.7; 428/36.6; 428/421; 428/426; 428/457; 428/500; 428/910
(58) Field of Search ...................... 220/567.2; 280/830; 428/35.7, 35.8, 35.9, 36.6, 421, 426, 457, 500, 36.7, 910

(56) References Cited

U.S. PATENT DOCUMENTS 5,612,101 A * 3/1997 Furuta et al. ................ 428/357
6,037,063 A * 3/2000 Muschiatti et al. ......... 428/480

FOREIGN PATENT DOCUMENTS

| DE | 4142016  | 6/1993  |
| EP | 306820   | 3/1989  |
| EP | 326355   | 8/1989  |
| GB | 2226976  | 7/1990  |
| JP | 57189832 | 11/1982 |
| JP | 59215842 | 12/1984 |
| JP | 10157738 | 6/1998  |

OTHER PUBLICATIONS

Encyclopedia of Polymer Science and Engineering, vol. 7, Films:Metallized Films, p. 82, Mar. 1988.*

* cited by examiner

Primary Examiner—Ramsey Zacharia
(74) Attorney, Agent, or Firm—Joseph C. Gil; James R. Franks

(57) ABSTRACT

Described is a molded plastic article which includes a barrier film. The molded plastic article is prepared by a process which involves: (a) providing a barrier film comprising at least one polymeric layer, the barrier film having a first surface and a second surface; (b) placing the barrier film in a mold such that the first surface of the barrier film is in contact with at least a portion of the interior surfaces of the mold; (c) injecting a polymer (e.g., a molten thermoplastic polymer) into the mold, the injected polymer contacting the second surface of the barrier film; and (d) removing the molded plastic article from the mold. Also described are molded articles according to the present invention, which include, for example, plastic containers, plastic fuel tanks, plastic storage units, plastic fascias and plastic motor vehicle interior cladding materials.

14 Claims, No Drawings

MOLDED PLASTIC ARTICLE COMPRISING A BARRIER FILM

CROSS REFERENCE TO RELATED PATENT APPLICATIONS

The present patent application claims priority under 35 U.S.C. 119 (a)–(d) of German Patent Application No. 100 37 269.4, filed Jul. 28, 2000.

FIELD OF THE INVENTION

The invention provides molded articles containing barrier films, which are prepared by an insert molding process.

BACKGROUND OF THE INVENTION

Observation of the new legal regulations relating to the maximum permissible total emissions from motor vehicles requires the development of new system solutions for the structural group of plastic materials used in motor vehicles. Determining the total emissions is typically performed using the so-called SHED test (Sealed Housing for Evaporate Determination test) in which the total emissions from a complete motor vehicle are determined under defined conditions. These total emissions thus take account not only of the hydrocarbon emissions (HC emissions) from the fuel system and engine surroundings and in particular the fuel tank, but also emissions from the car body and the operating substances, and also from internal fittings, the electrical system and tires.

The technology to produce, for example, plastics fuel tanks (PFTs) has been constantly further developed in recent years, with regard to the maximum hydrocarbon emissions, against the background of ever more stringent legal requirements.

It is known that PFTs can be produced by the blow molding process, in which an extruded tube (premolding) is generally pressed into mold using compressed air and solidified there. To improve the HC barrier effect, specific barrier layers, for example made of ethylenevinyl alcohol, are incorporated in the layered composite by a coextrusion process. "Barriertechnologien: Ein Beitrag zur Emmissionsreduzierung von Kraftstoffanlagen", W. Klee, U. Karsch, T. Kempen, p. 309; Conference proceedings for the specialist conference "Kunststoffe im Automobilbau" 2000.

However, these molded items still have considerable emissions. In addition it is a disadvantage of the blow molding process that the internal faces of the tanks are difficult to access when fitting connecting pieces and functional parts and also that they have long cooling times since rapid cooling can occur at only one face. As a result of the actual mode of operation, it is not possible to produce ribs and undercuts when blow molding. Targeted adjustment of a change in wall thickness is possible to only a limited extent via the wall thickness of the premolding or the blow-up ratio.

An alternative is the use of a second skin which surrounds the tank and has adsorbents on its inner face, which act as spacers. The space in between the tank and the outer shell is flushed out with air being sucked in by the motor (DE-A 41 42 016). The disadvantages here are the costly technical procedure and the necessity for adsorbents.

SUMMARY OF THE INVENTION

The object of the invention is to provide a process and molded items which can be produced by this process, wherein the molded items ensure reduced emissions, in particular of hydrocarbons and of substances contained in plastics, and in addition which do not have the mechanical/technical disadvantages described above. accordance with the present invention, there is provided a molded plastic article comprising a barrier film wherein said article is prepared by a process comprising:

(a) providing a barrier film comprising at least one organic polymeric layer, said barrier film having a first surface and a second surface;

(b) placing said barrier film in a mold such that the first surface of said barrier film is in contact with at least a portion of the interior surface or surfaces of said mold;

(c) injecting a polymer and/or polymer precursor (e.g., a molten thermoplastic polymer and/or a thermosetting polymer composition) into said mold, the injected polymer and/or polymer precursor contacting the second surface of said barrier film; and (d) removing said molded plastic article from said mold.

Unless otherwise indicated, all numbers expressing quantities of ingredients, reaction conditions, etc. used in the specification and claims are to be under stood as modified in all instance by the term "about."

DETAILED DESCRIPTION OF THE INVENTION

The present invention provides a process and a molded plastic item (or article) produced by such a process. Molded plastic articles according to the present invention have particularly good barrier properties, in particular with regard to hydrocarbon emissions. The barrier films of the molded plastic articles may be multilayered and may also be preshaped prior to insert molding. Insert molding is a process in which such a film, e.g., a polymeric film, is laid in an injection mold and then a molten or liquid polymer material or composition is sprayed or injected into the mold.

In an embodiment of the present invention, the barrier film is preshaped prior to insertion into the mold. Preshaping the barrier film too severe a degree of overstretching in the injection mold, which can result in impairment of the barrier properties of the barrier film. Conventional cold or hot forming processes may be used for the forming procedure. The barrier film may then be optionally trimmed prior to placing it in the injection mold. For a general description of preshaping and trimming methods used in insert molding processes, see for example, "Neues vom Mehrkomponenten-Spritzgießgen", A. Jaeger, Kunststoffe 89 (1999)/9 p.85 et seq., Carl Hanser Verlag, Munich.

Insert molding of textiles is a known process in the area of internal parts for cars. The insert molding of films to produce covers and switches for operating the air conditioning units in cars and also housings or apertures for electrical equipment has become ever more common recently. The films used in these insert molding processes are typically made of polycarbonate (PC), poly(methyl methacrylates) (PMMA) or acrylonitrile-butadiene-styrene polymers (ABS), and may be printed or lacquered on the front face (i.e., the first surface of the film). The films are often preshaped prior to insert molding in order to avoid overstretching.

In the case of film insert molding, a film (e.g., a decorated polymeric film) is generally formed and trimmed. The formed and trimmed film is then laid in the injection mold and insert molded with a polymer.

EP-B 0371 425 describes a process for producing thermomolded plastic parts in which a film material is shaped under defined conditions (pressure, time, temperature) and optionally insert molded with a plastic material.

The films described as barrier films according to the invention may be monolayered films, multilayered films or composite films which reduce emissions of, for example, hydrocarbons. The multilayered and composite films are preferably produced via lamination or coating processes or a coextrusion process.

At least one polymeric layer of the barrier films of the present invention, may be monoaxially or biaxially stretched.

The polymeric layer of the barrier film of the present invention comprises thermoplastic and/or thermoset polymers.

In an embodiment of the present invention, the barrier film is a composite barrier film, which comprises at least one metallic layer. Composite barrier films comprising at least one metallic layer are preferred in the present invention. Barrier film composites in which the metallic layer is present as one single layer or as a layer evaporated or vacuum coated onto at least one polymeric layer of the barrier film composite, e.g., onto a backing film, are particularly preferred. These metallic layer(s) may comprise, in particular, aluminium oxide and/or silicon oxide. In an embodiment of the present invention, aluminium oxide and/or silicon oxide are evaporated onto or vacuum coated onto at least one polymeric layer of the composite barrier film, e.g., onto a backing layer of the composite barrier film.

The film composite may contain backing films and layers with special barrier properties or layers to bond individual layers such as coupling agent layers and primers.

Examples of suitable thermoplastic backing films include, but are not limited to, layers containing: polyamide, in particular polyamide 6; polyesters, in particular polyethylene terephthalate or polybutylene terephthalate; polycarbonate; thermoplastic polyurethanes; polyolefins, such as polyethylene and polypropylene; polyimides, polystyrene; and polyacrylates, e.g., PMMA.

Examples of suitable thermoset backing layers, include but are not limited to layers containing plastics made from: UF (urea/formaldehyde resin); PF (phenol/formaldehyde resin); and/or EP (epoxide resin).

In a preferred embodiment of the present invention, at least one layer of the barrier film comprises a halogen-containing polymer. Layers comprising halogen-containing polymers typically possess desirable barrier properties.

Vinyl polymers containing halogens are particularly preferred for use as the halogen-containing polymer(s) in the barrier film of the present invention. Examples of halogen-containing polymers that may be used in the present invention include, but are not limited to: polyvinyl fluoride (PVF), polyvinylidene fluoride (PVDF), polyvinyl chloride (PVC), polyvinylidene chloride (e.g., PVDC and VCNDC copolymers), polytetrafluoroethylene (PTFE) and mixtures thereof. Polyacrylonitrile (PAN) is also preferred. Polyvinyl fluoride (PVF) is especially preferred.

At least one layer of the barrier film of the molded plastic article of the present invention may comprise at least one polymer selected from polyvinyl alcohols (PVOH) and ethylene/vinyl alcohol copolymers (EVOH). The EVOH copolymers are preferred. Furthermore, polyketones may also be used.

Multilayered and/or composite barrier films may be produced using known laminating and coating processes (Ahlhaus, Otto: Verpackung mit Kunststoffen; Munich, Vienna, Hanser, 1997). These include, in particular, lamination processes, flat film coextrusion, blown film (co) extrusion and calendering processes.

The barrier film (including multilayered and/or composite barrier films) or individual layers in the barrier film may be subjected to surface treatment before, during or after production. These surface treatments include, for example, compression processes, steam processes, lacquering processes or processes for applying barrier layers, such as fluorination processes or metallising processes or processes for applying metal oxide layers (e.g., silicon and/or aluminum oxide layers) or plasma processes.

In the preparation of the molded article of the present invention, the polymer material injected into the mold may be selected from a thermoplastic polymer and/or thermosetting polymer composition (e.g., a 2-pack polyisocyanate/polyol composition), preferably a thermoplastic polymer. The injected polymer may be further selected from polyamide, polyester, polyethylene terephthalate, polybutylene terephthalate, polycarbonate, thermoplastic polyurethanes, ABS, styrene polymers, polyolefins such as polyethylene and polypropylene, and combinations or mixtures thereof.

The injected polymer may optionally contain at least one of fillers, reinforcing agents, conventional additives, such as processing additives, stabiliser systems and flame-retardant additives.

When insert molding, the barrier film is laid in an injection mold such that the first surface of the barrier film is in contact with at least a portion of the internal surface of the mold, and then polymer material (e.g., molten polymer) is injected into the mold and contacts the second surface of the barrier film. The barrier film can be given a three-dimensional shape prior to insert molding. The barrier film is bonded to the injected polymer as a result of insert molding process.

Molded articles according to the invention provide a substantial barrier to hydrocarbons, e.g., from fuels and operating substances, and also to additives, such as stabilisers and plasticisers, and also to monomers, dimers, trimers and oligomers, as well as degradation products which are produced by thermal degradation or by UV irradiation. Molded articles according to the invention thus substantially prevent emissions which arise from substances which are contained inside, for example, a tank (e.g., fuel tanks) and also emissions which arise from the molded articles itself.

Molded articles according to the invention are produced in an injection molding process in which an optionally preshaped barrier film is laid in the mold and is then insert molded with a thermoplastic and/or thermosetting material.

Before laying the barrier film in the injection mold, dust and contaminants are typically removed from the surface of the film by blowing with ionised air. The barrier film is laid in the mold with the aid of handling equipment in order to be able to achieve precise reproducibility and efficient production. Retention of the barrier film in the injection mold may be achieved by the geometry of the film. Generally, measures such as electrostatic charging or mechanical fixing are required in order to improve retention of the barrier film in the mold. In the event of long flow paths, it has proven useful to use needle valve nozzles which are opened in a cascade system in accordance with the filling or polymer injection procedure, in order to avoid the formation of creases.

In the event of relatively large part-dimensions, special attention must be given to crease formation, flushing out, warping, delamination and overflowing of the molten material into the visible region. Important factors relating to crease formation in the region of weld lines are the type of film material, the thickness of the film and the distance from the injection point. Crease formation can be avoided by using a suitable barrier film material with an elevated softening temperature, increased film thickness and an improved flow path. If the mold is improperly designed, crease formation may take place in the region of the weld line.

With existing injection molds which are used later for film insert molding, acceptable parts typically cannot be produced without altering the mold. The feed system and gating system typically have to be redesigned due to the wall thickness being reduced by the thickness of the film and the rheological requirements necessary for insert molding. Therefore, when designing the mold, appropriate precautions should be taken to account for film insert molding.

Molded articles produced in accordance with the present invention can be used as, for example, molded articles for storing or piping HC-containing media such as operating substances and fuels, in particular as plastics fuel tanks or as molded items in the motor vehicle interior, in particular as cladding parts, fascias or storage units.

Molded articles according to the present invention include, but are not limited to, industrial hollow items, plastics tanks, motor vehicle interior cladding parts, fascias, storage units and particularly preferably plastics fuel tanks, expansion tanks, containers and storage and transport tanks.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A molded plastic article comprising a barrier film wherein said article is prepared by a process comprising:
    (a) providing a barrier film comprising at least one polymeric layer, said barrier film having a first surface and a second surface, said barrier film being a composite barrier film comprising at least one metallic layer selected from at least one of aluminum oxide and silicon oxide, said metallic layer being evaporated and vacuum coated onto at least one polymer layer of said barrier film, said barrier film comprising at least one polymeric layer that is one of monoaxially stretched and biaxially stretched wherein said polymeric layer comprises a polymer selected from the group consisting of halogenated polymer, PVOH, and EVOH;
    (b) placing said barrier film in a mold such that the first surface of said barrier film is in contact with at least a portion of the interior surfaces of said mold;
    (c) injecting a polymer into said mold, the injected polymer contacting the second surface of said barrier film; and
    (d) removing said molded plastic article from said mold.

2. The molded plastic article of claim 1 wherein said barrier film is a multilayered barrier film which is produced by one of coextrusion, coating, calendering and laminating.

3. The molded plastic article of claim 1 wherein said barrier film is a composite barrier film comprising at least one layer of aluminium oxide.

4. The molded plastic article of claim 1 wherein at least one layer of the barrier film comprises a halogen-containing polymer.

5. The molded plastic article of claim 4 wherein said halogen-containing polymer is selected from at least one of PVF and PVDF.

6. The molded plastic article of claim 1 wherein at least one layer of the barrier film comprises a polymer selected from at least one of PVOH and EVOH.

7. The molded plastic article of claim 1 wherein the injected polymer comprises (i) a material selected from at least one of a thermoplastic polymer and a thermosetting polymer composition, and (ii) optionally at least one of fillers, reinforcing substances and additives.

8. The molded plastic article of claim 1 wherein said barrier film is shaped prior to placing said barrier film in said mold.

9. A method of using the molded plastic article of claim 1 for at least one of storing, holding and transporting HC hydrocarbon-containing materials.

10. The method of claim 9 wherein said hydrocarbon-containing material is a hydrocarbon fuel.

11. A method of using the molded plastic article of claim 1 as a molded plastic article in motor vehicle interiors.

12. A method of using the molded plastic article of claim 1 as a plastic container.

13. The method of claim 12 wherein said plastic container is a plastic fuel tank.

14. The molded plastic article of claim 1 wherein said barrier film is a composite barrier film containing at least one layer of silicon oxide.

* * * * *